US007336842B2

(12) United States Patent
Kondo

(10) Patent No.: US 7,336,842 B2
(45) Date of Patent: Feb. 26, 2008

(54) METHOD AND APPARATUS FOR GENERATING DATA REPRESENTATIVE OF FEATURES OF AN IMAGE

(75) Inventor: Hiroshi Kondo, Fukuoka (JP)

(73) Assignees: Global Security Design, Inc., Tokyo (JP); Hiroshi Kondo, Fukuoka (JP)

( * ) Notice: Subject to any disclaimer, the term of this patent is extended or adjusted under 35 U.S.C. 154(b) by 635 days.

(21) Appl. No.: 10/470,285

(22) PCT Filed: Oct. 25, 2002

(86) PCT No.: PCT/JP02/11095

§ 371 (c)(1),
(2), (4) Date: Jul. 24, 2003

(87) PCT Pub. No.: WO03/049028

PCT Pub. Date: Jun. 12, 2003

(65) Prior Publication Data

US 2004/0234131 A1 Nov. 25, 2004

(30) Foreign Application Priority Data

Nov. 30, 2001 (JP) ............................. 2001-367829

(51) Int. Cl.
*G06K 9/46* (2006.01)
*G06K 9/60* (2006.01)
*G06K 5/00* (2006.01)

(52) U.S. Cl. ...................... 382/250; 382/306; 382/191; 235/380

(58) Field of Classification Search ................ 382/250, 382/305, 306, 191
See application file for complete search history.

(56) References Cited

U.S. PATENT DOCUMENTS 5,241,600 A * 8/1993 Hillis ........................ 713/186
5,466,918 A * 11/1995 Ray et al. .................. 235/380
5,636,292 A * 6/1997 Rhoads ...................... 382/232
6,373,891 B1 * 4/2002 Schulze ................. 375/240.01

FOREIGN PATENT DOCUMENTS

JP 2001-52142 2/2001

OTHER PUBLICATIONS

Machine Translation of 2001-52142 cited in applicant's informaiton disclosure.*
Ching-Yung Lin, et al.; "A Robust Image Authentication Method Distinguishing JPEG Compression from Malicious Manipulation", IEEE Transactions on Circuits and Systems of Video Technology, vol. 11, No. 2, Feb. 2001.

(Continued)

*Primary Examiner*—Andrew W. Johns
*Assistant Examiner*—Anthony Mackowey
(74) *Attorney, Agent, or Firm*—Norris, McLaughlin & Marcus

(57) ABSTRACT

Image data representative of features of a respective plurality images are transformed using a two dimension discrete cosine transform (DCT), and the DCT sign coefficients of the respective DCT transforms for the images are selectively used to generate a highly compressed and secure one-dimension binary data representation of a subject image whose image data has undergone a DCT transform. The binary data representation can be, for example, of a face image and is readily applicable to a passport, a credit card, a driver's license, an ID card, and the like, for use in rapid, secure face authentication.

5 Claims, 9 Drawing Sheets

(c)

(b)

(a)

OTHER PUBLICATIONS

Hiroshi Kondo, et al.; "Identification of DCT Signs for Sub-Block Coding"; International Symposium on Signal Processing and its Applications (ISSPA), Kuala Lumpur, Malaysia, Aug. 13-16, 2001.

Gary L. Friedman, et al.; "The Trustworthy Digital Camera: Restoring Credibility to the Photographic Image"; IEEE Transactions on Consumer Electronics, vol. 39, Nov. 1993, No. 4, New York, US.

* cited by examiner (a)

(b)

(a)

(b)

(a)

(b)

(c)

(a')

(b')

(c')

(a)

(b)

(a')

(b')

(c)

(b)

(a)

METHOD AND APPARATUS FOR GENERATING DATA REPRESENTATIVE OF FEATURES OF AN IMAGE

FIELD OF THE INVENTION

The present invention relates to a device and a method to make the identification signal of the image feature and, more particularly to a device and a method to make the identification signal of the image feature that can make the image data volume smaller by using the DCT sign characteristic of arbitrary signals including images, and also can be applied to a new type of passport, credit card, driver's license, or ID card that is hard to forge by displaying a face photograph and the bar code corresponding to the face photograph to lead to a great contribution to the overall security system.

DESCRIPTION OF THE RELATED ART

The identification by a person's face has so far been made at various places to prevent a suspicious individual from entering the building or premises or to confirm whether the bearer of a passport is a true person.

As for such face identification, a person is authenticated by comparing the person's face with the face image such as an affixed photo or database registered in advance. For comparing the concerned person's face with the face image registered in advance, the face image of the person to be authenticated must be input into the computer, and the concerned persons face must be compared by the computing algorithm with the face image registered in advance. It means that the processing speed for face identification is dependent on calculating time on computer, therefore, if the data volume used in the database was reduced greatly, the speed of processing would be faster, and the data volume to be used for registering would be also smaller. However, because the traditional image data is huge in volume, it is problematic that it takes much time to compare and identify the image data, and a very big capacity is required for registering database.

It is indeed possible to consider adoption of the method for compressing an image by the traditional image compression technique such as JPEG (Joint Photograph Expert Group) and GIF. However, even if such a traditional compression technique is applied, the volume of the image data will remain still big, though it is expected to reduce to some extent.

SUMMARY OF THE INVENTION

One of the purposes of the present invention is to provide a device and a method to make an identification signal of the image feature with a small volume of database by using DCT sign characteristic of arbitrary signals including the image. Another purpose of the present invention is to provide a device and a method to make the identification signal of the image feature applicable to a new type of passport, credit card, driver's license, or ID card that is hard to forge by displaying a face photograph and the bar code corresponding to the face photograph to lead to a great contribution to the overall security system, and also to provide passports, credit cards, driver's licenses, and ID cards produced by means of the said device and the method.

BRIEF DESCRIPTION OF THE DRAWINGS

FIG. 6 (a) is a combination of the DCT amplitude of a dome and the DCT signs of a woman;

FIG. 6 (b) is an opposite combination of the DCT amplitude of a woman and the DCT signs of a dome;

FIGS. 7 (a'), (b'), (c') show the SOS images corresponding to FIGS. 7 (a), (b), (c) respectively;

DESCRIPTION OF THE INVENTION AND PREFERRED EMBODIMENTS

The present invention will next be described in detail by means of an example of the device to make the identification signal of the image feature according to the present invention.

Figure 1:
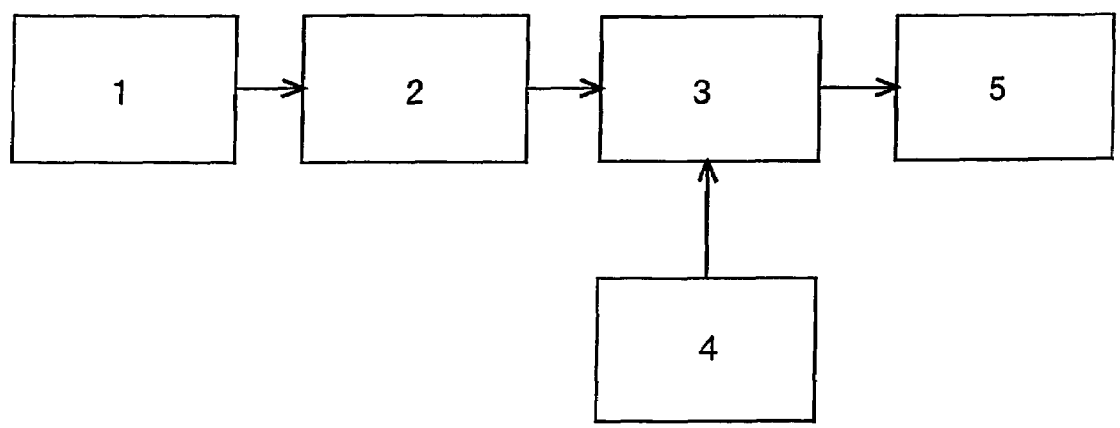
FIG. 1 is a block diagram showing an embodiment of the device to make the identification signal of the image feature in accordance with the present invention.

Referring to FIG. 1 showing a block diagram of one example of the device to make the identification signal of the image feature according to the invention, 1 is an image input part; 2 is a DCT conversion part where the data of an input image is transformed into a two-dimension discrete cosine transform (DCT) signal; 3 is an extracting part where the features of the above-mentioned image data are extracted based on the information provided by a DCT sign extraction information providing part 4; 5 is a one-dimension binary signal composing part where one-dimension binary signals are composed of the DCT signs of the said extracted data.

Figure 2:
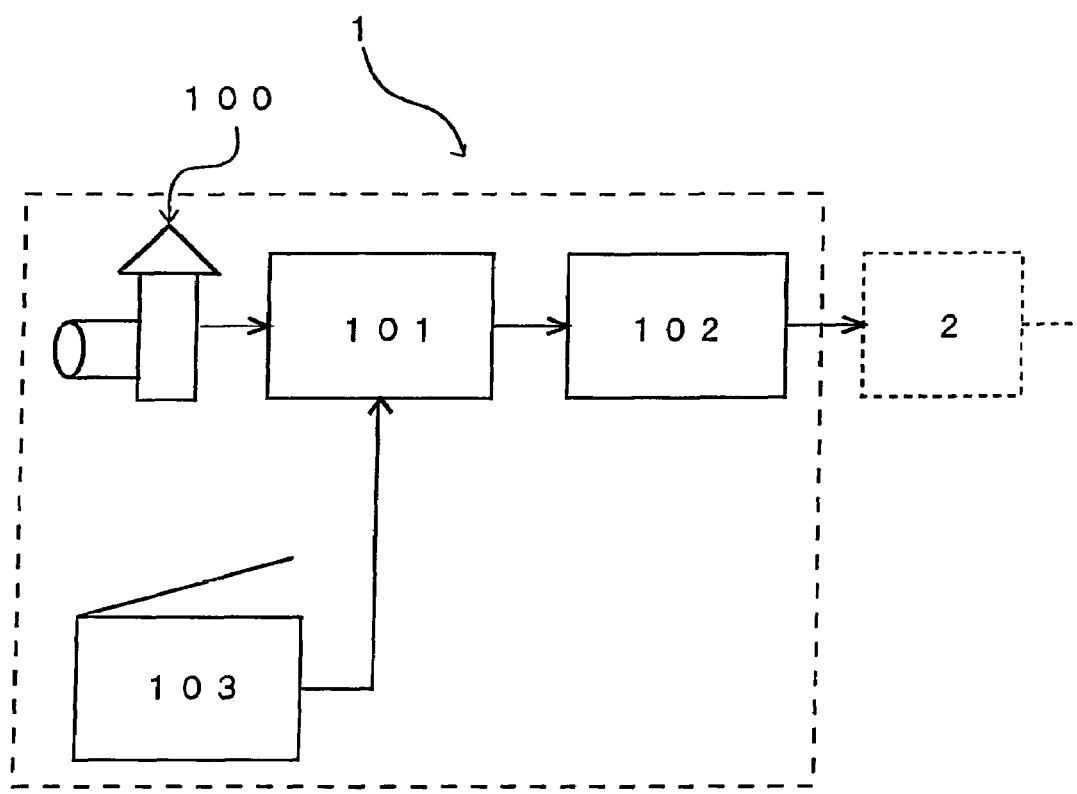
FIG. 2 is a detailed block diagram illustrating an embodiment of the image input part in accordance with the present invention.

The details for the image input part 1 are explained based on FIG. 2 as follows: Referring to FIG. 2 the image input part 1 consists of a picture-taking means 100 taking picture of a subject, an image capturing and processing part 101 capturing necessary images, and a pixel number setting part 102.

A digital camera can be used as a picture taking means 100 for example. A digital camera will shoot subjects such as the face of a person or the face photo of a person through its photograph lens, form their images on the photographing face of CCD (photograph devices), and photoelectrically transform the optical images formed by the CCD into signal charge corresponding to the amount of light in the unit of pixel. The signals photoelectrically transformed is input into the image processing part, where noise is lowered, gain etc. is adjusted, and the said signals are converted into digital signals by an A/D converter.

Referring to FIG. 2, the digital camera can be replaced by a scanner-registering part 103. The data registered is a multi-valued digital data.

The multi-valued digital data obtained from the digital camera 100 or the scanner-registering part 103 is sent to the image capturing and processing part 101 that captures necessary parts of the images. It is preferable that only a face image is captured as for a portrait, though shoulders part may be included.

In the pixel number setting part 102 the pixel number such as N×N pixels is set up. N differs according to objects; it takes 32, 64, 128, 256, or 512. Then, in the DCT conversion part 2 (the two-dimension DCT part) the data of input image is transformed into the two-dimension DCT signs. Because of its characteristic of developing real numbers by even function, DCT is very useful for compressing the image. The two-dimension DCT sign is defined by the following equations, where for the signal $f_{mn}=0, \ldots, M-1; n=0, \ldots, N-1$.

[Equation 1] Transform:

$$F_{uv} = \frac{2C(u)C(v)}{\sqrt{M \cdot N}} \sum_{m=0}^{M-1} \sum_{n=0}^{N-1} f_{mn} \cos\left[\frac{(2m+1)u\pi}{2M}\right] \cos\left[\frac{(2n+1)v\pi}{2N}\right] \quad (1)$$

[Equation 2] Inverse transform:

$$f_{mn} = \frac{2}{\sqrt{M \cdot N}} \sum_{u=0}^{M-1} \sum_{v=0}^{N-1} C(u)C(v) F_{uv} \cos\left[\frac{(2m+1)u\pi}{2M}\right] \cos\left[\frac{(2n+1)v\pi}{2N}\right] \quad (2)$$

where $f_{mn}$ is the image signal and F, is the transform coefficient of DCT and C(k) is the regularized constant given by

[Equation 3]

[Equation 3]

$$C(k) = \begin{cases} 1/\sqrt{2}; & k=1 \\ 1; & \text{otherwise} \end{cases} \quad (3)$$

where $F_{uv}$ is a real number, therefore the separable function for the amplitude and the following equation:

[Equation 4]

$$F_{uv} = |F_{uv}|e^{j\theta_{uv}} \quad (4)$$

where $\theta_{uv}$ is expressed as:

[Equation 5]

$$\theta_{uv} = \begin{cases} 0; & F_{uv} \geq 0 \\ \pi; & F_{uv} < 0 \end{cases} \quad (5)$$

Figure 3:
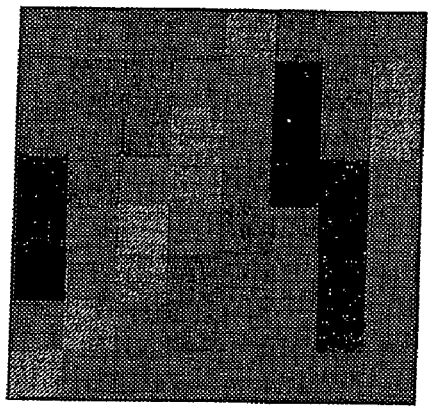
FIG. 3 shows the image by 8×8 pixels.
Figure 4:
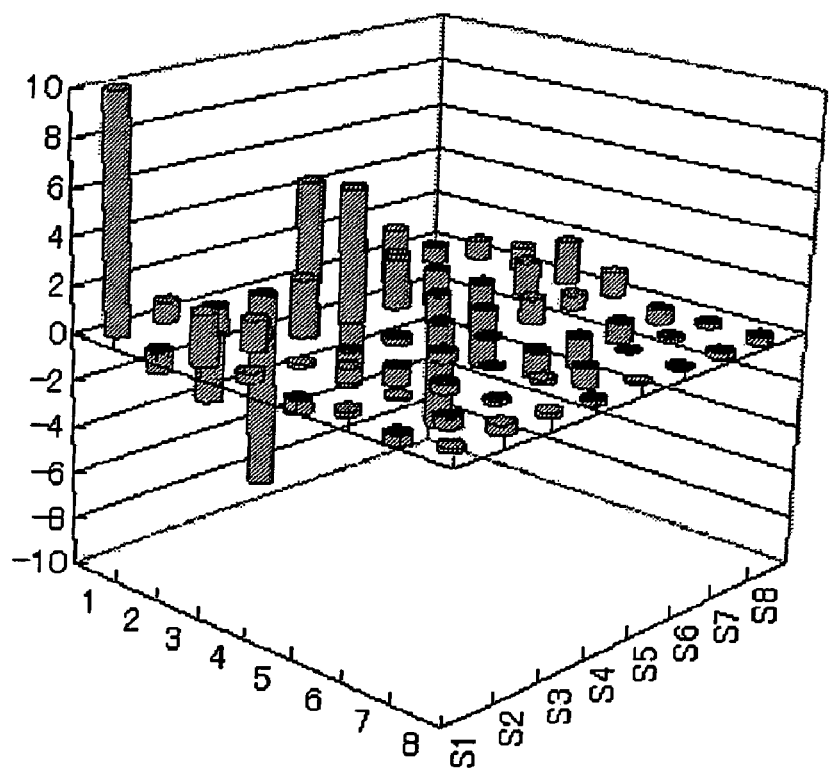
FIG. 4 is a cubic chart illustrating the relationship between the amplitude and the position of the coefficient after DCT conversion shown in FIG. 3 is made.

The image thus captured at the image input part 1 is transformed by the two-dimension discrete cosine transform (DCT) as above-mentioned in the two-dimension DCT part 2, and therefore, for instance the image (8×8 pixels) shown in FIG. 3 can be shown as the relation between the amplitude and the position of the DCT coefficient in FIG. 4. Though for the convenience of explanation, only the image of 8×8 pixel is referred to herein, the number of pixels is not limited in particular.

Concerning the sign and the inventor of the present following:

For the DCT Amplitude as the Processing:

DCT (coefficient) amplitude expresses the power at each element (frequency) position, in other words, the size of the element (contribution rate) included in an original signal. Therefore, when an original signal is re-composed, it becomes, in general, necessary to know about amplitude information on how many coefficients should be taken to reach a targeted S/N rate from the square error margin viewpoint. Moreover, since the inversion transform for the power spectrum becomes the autocorrelation function in Fourier transform (Wiener-Khinchine Theorem), the amplitude of DCT made from Fourier transform has a characteristic similar to Fourier transform (though, of course, not in strictly mathematical terms). In a word it can be said that the DCT amplitude holds the information on the energy of an original image signal.

Figure 5:
FIG. 5 shows the original photographs.
Figure 5:

For the DCT Sign:

The DCT sign holds very important information on a signal. Obviously difference in a sign will make difference in a signal, even if the amplitude is the same. For example, two-dimension DCT taken from the original images shown in FIGS. 5 (*a*) and (*b*) becomes the images shown in FIG. 6 (*a*) and FIG. 6 (*b*), respectively, after their DCT signs have been exchanged. That is, FIG. 6(*a*) is a combination of the woman's DCT signs and the DCT amplitude of the dome. And oppositely, FIG. 6(*b*) is a combination of DCT signs of the dome and the woman's DOCT amplitude. It is obvious that FIG. 6(*a*) is a woman's photograph, and no piece of the look of the dome is found.

Figure 6:
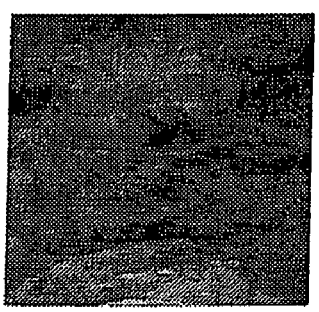
FIG. 6 shows the images in which the two-dimension DCT taken from the original photographs shown in FIGS. 5 (a) and (b) have let the DCT signs exchanged.
Figure 6:
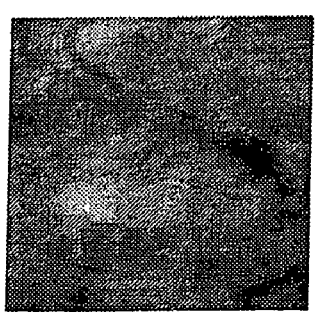

Similarly it can be clearly recognized that FIG. 6(*b*) is an image from the photograph of the dome, and no piece of the woman's face is found. Therefore, it can be said that the DCT sign has the information constituting the framework of the signal when the signal is composed. The DCT sign plays a predominant role in the re-composition of a signal.

For Sign-Only Synthesis

Figure 7:
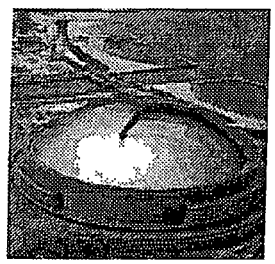
FIGS. 7 (a), (b), (c) show the original pictures of a dome, a human face, and plant leaves respectively.
Figure 7:
Figure 7:
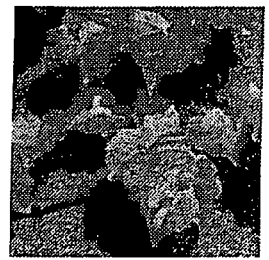
Figure 7:
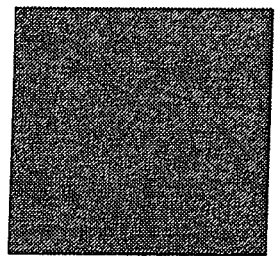
Figure 7:
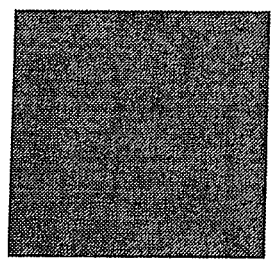
Figure 7:
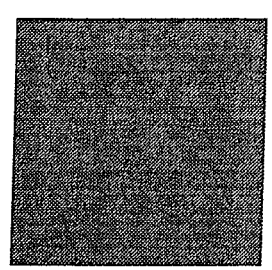

In addition, Sign-only synthesis (also called SOS) that is an inversion of only the sign showing the characteristic of DCT sign is explained as follows: Sign-only synthesis is defined by the following equation according to the aforementioned equations (2) and (4):

[Equation 6]

$$f_{mn} = \frac{2}{\sqrt{M \cdot N}} \sum_{u=0}^{M-1} \sum_{v=0}^{N-1} C(u)C(v)e^{j\theta_{uv}} \cos\left[\frac{(2m+1)u\pi}{2M}\right] \cos\left[\frac{(2n+1)v\pi}{2N}\right]$$

where $\theta_{uv}$ is defined by the equation (5), that is, it is equal to the inverse-transform equation 2, where all the amplitude |F| in the equation (4) is replaced by 1. FIG. 7 shows an example of sign-Only synthesis. FIGS. 7 (a), (b), (c) are the original images of the dome, the person's face, and the leaves of the plant respectively, and FIGS. 7 (a'), (b'), (c') are the SOS images corresponding to the dome, the person's face, and the leaves of the plant respectively. This makes it clear that the SOS image is correspondent one-on-one to the original image from the viewpoint of the image recognition. On the other hand, the inverse-transition of only the amplitude, or Amplitude-only synthesis (AOS), is related to the autocorrelation function of the original image, according to Wiener-Khinchine theorem, and has no meaning as an image.

Figure 8:
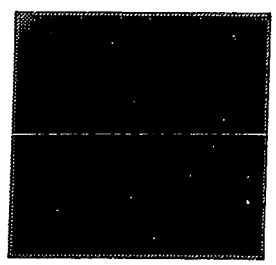
FIG. 8 is the AOS of the human face picture shown in FIG. 7 (b)

FIG. 8 shows the AOS for the person's face image of FIG. 7(b). The AOS, being black, it is almost useless as an image.

Figure 9:
FIG. 9 shows unique patterns taken by the DCT signs, depending on each original image.
Figure 9:
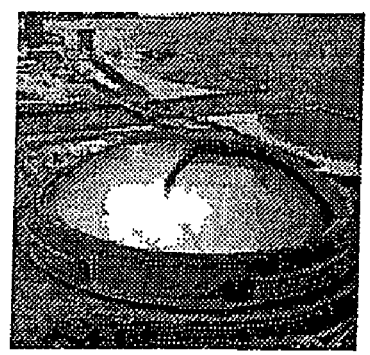
Figure 9:
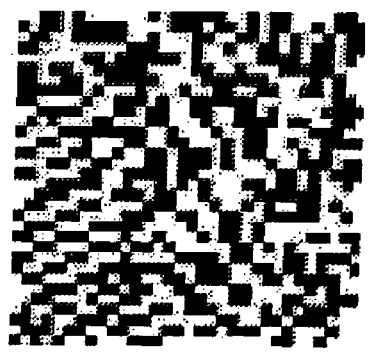
Figure 9:
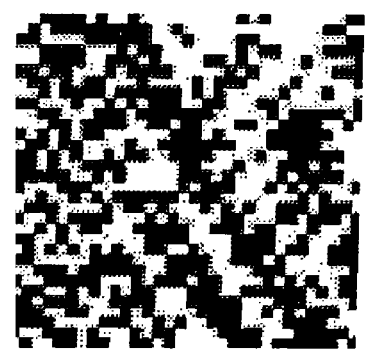

For the Signal of DCT Sign:

Judging from the fact that a silhouette line drawing as shown in FIG. 7 was obtained only from the positive and negative signs, the arrangement pattern of the positive and negative signs can be said to have an important meaning. FIG. 9 shows that the DCT signs take unique patterns, depending on each original image.

The DCT sign of an arbitrary signal including the image substantially corresponds one-on-one with an original signal, and its inverse-transform (Sign-only synthesis) becomes just like the second difference value. In case a signal is an image, its Sign-only synthesis clearly expresses the silhouette line of the image, and for the original image recognition, the Sign-only synthesis can be treated as equivalent to an original signal. That is, this means that the original image can be treated as equivalent to the DCT sign (one bit of plus or minus).

Those sign patterns are obviously different each other, and it is quite clear that the arrangement of the positive or negative signs decides the image. Therefore it can be said that arrangement of the plus and minus signs of the DCT decides the image. Therefore, the original signal can be identified by the arrangement of plus and minus signs.

Figure 10:
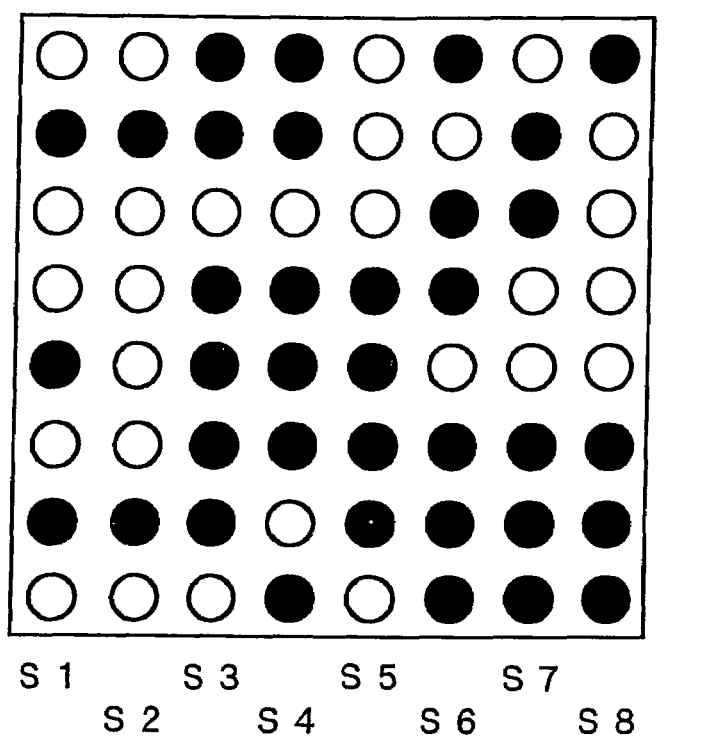
FIG. 10 is a plan of FIG. 4 projected from right above, in which black circles show "−" signs and white circles show "+" signs.

The DCT conversion part 2 in the present invention decides the plus and minus signs as shown in FIG. 10 (the white circles represent a positive sign, and black circles represent a negative sign in the figure), in case, for instance, the DCT coefficient is obtained as shown in FIG. 4 by transforming an image by DCT as shown in FIG. 3. That is, the distribution of positive and the negative signs shown in FIG. 10 can be obtained by extracting only positive and the negative signs from DCT conversion coefficient shown in FIG. 4 having the positive and the negative signs as well as the volume.

Thus, the DCT conversion part 2 can indicate the feature of the image, using only a small volume of information, by deciding the positive and negative signs after obtaining DCT sign of the image.

In addition, in the present invention the feature of the image can be shown based on even smaller volume of information, since parts effective for showing the feature are extracted by means of a method described later based on the information (DCT sign extraction information) provided by the DCT sign extraction information providing part 4 in the extraction part 3 by the method as described later. The DCT sign extraction information is obtained from the DCT average amplitude of a lot of object images or the DCT amplitude size of one object image. That is, the DCT sign extraction information providing part 4 provides the information determined from the size of full picture DCT average amplitude of a lot of object images or the size of DCT amplitude for one object image.

The information determined from the DCT average amplitude of a lot of object images or the DCT amplitude size of one object image is to be decided in advance by the following methods before each of the devices according to the present invention is produced.

For instance, after capturing the face images of 50-100 people, and transforming by the DCT each of those face images, the position having important information, that is, the positions of the large amplitude are extracted. The positions in which the signs are extracted are decided from those averages, and this positions are taken as the information provided by the DCT sign extraction information providing part 4.

On the other hand, in case only a few people are the identification objects, the face image of each person is transformed into DCT signals, and then the positions holding important information, i.e. the positions of large amplitude are extracted, and the positions in which the signs are extracted are decided. These positions are taken as the information provided by the DCT sign extraction information providing part 4. In case of the security for an apartment house where there are few people as the identification objects, it is preferable that the information decided depending on the latter method is provided from the DCT sign extraction information providing part 4. The information decided as above-mentioned, offers information on which sign of the position, i.e., which frequency is to be extracted, which sign of the position, i.e., which frequency is not to be extracted.

Figure 11:
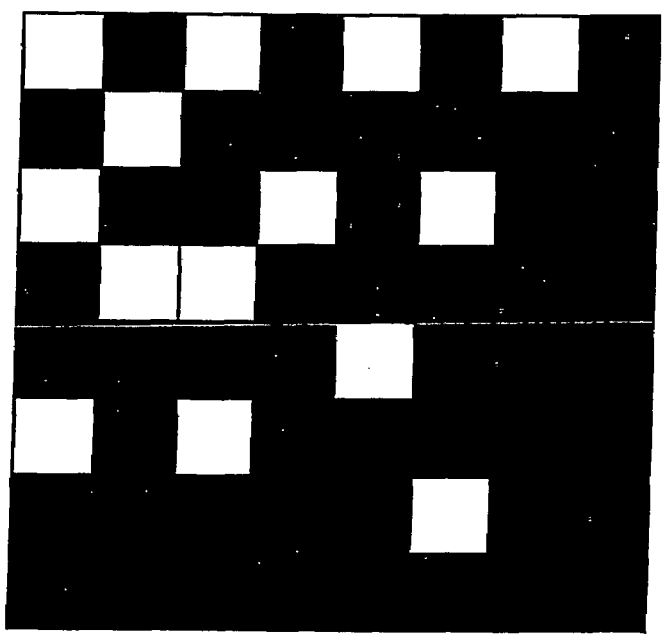
FIG. 11 shows a map for taking out the sign made from the average value of DCT sign amplitudes of a lot of people's face images.
Figure 12:
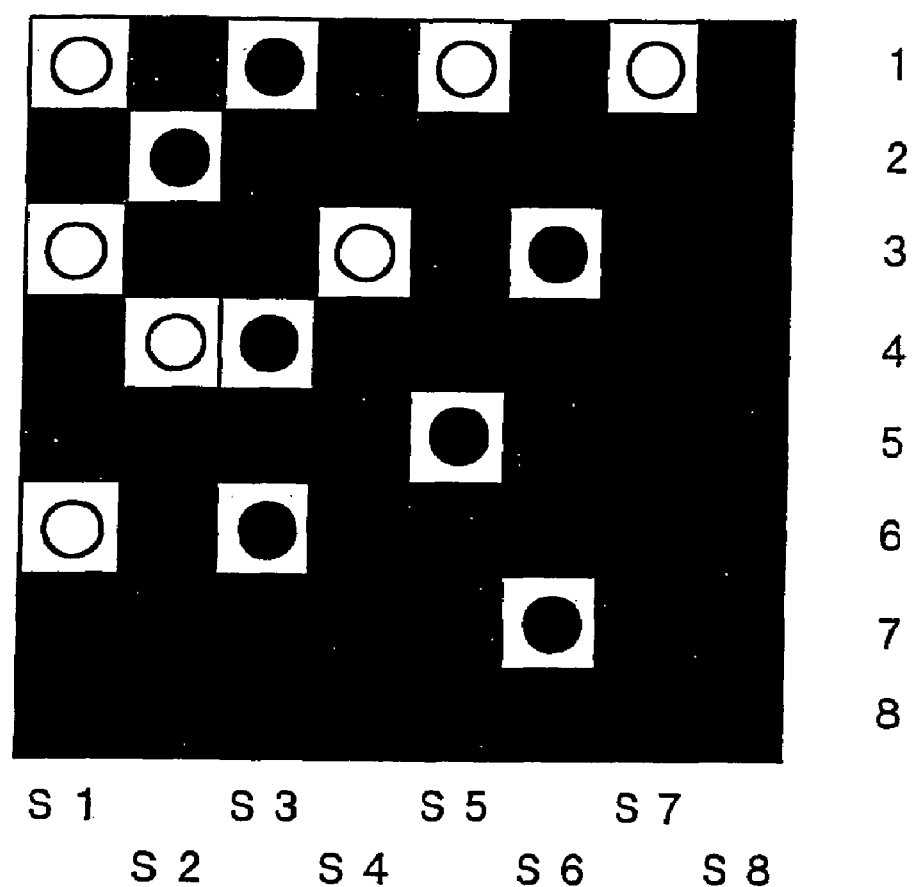
FIG. 12 shows the positions where the signs should be taken out, whereas the positions are illustrated as circles on white backgrounds that are obtained by laying the map of FIG. 11 on FIG. 10.

In the extraction part 3, in the process of extracting an image, of which positive and negative signs have been decided, for instance, the information as shown in FIG. 11 is provided from the DCT sign extraction information offering information part 4. FIG. 11 is the information provided by the DCT sign extraction information providing part, in which the positions of white squares show where the sign should be extracted, and the positions of black background show where the positions are not extracted. The sign is extracted based on the information provided by the DCT sign extraction information providing part 4 by comparing the information provided by the DCT sign extraction information providing part 4 as shown in FIG. 12. Extraction may be made by scanning lines, for instance, from the top left square frame position toward the right one by one on FIG. 12, and signals obtained may be composed as a row of one-dimension binary signals.

There is no limitation on scanning direction; not only scanning each line from the left frame position, but also scanning each line from the right frame position, or scanning files one by one may be made. In short, scanning shall be made according to any order determined beforehand for each device according to the present invention. The form of the information provided by the DCT sign extraction information providing part 4 is not limited to the form shown in FIG. 11. There is no limitation on the form of the information, as far as the information shows the frequency position to be extracted. Therefore, the information can be the progression showing the frequency position to be extracted.

Based on the signs extracted in the above-mentioned manners, one-dimension binary information is built in the one-dimension binary signal composing part 5. Referring to FIG. 1, a very simple and short one-dimension binary signal of a image can be composed, if only the sign for the part characterizing the signal is taken out in the extraction part 3 where the feature of the above-mentioned image data is extracted based on the information provided by the DCT sign extraction information providing part 4, and is reconstructed as a one-dimension signal in the one-dimension binary signal composing part 5 in the order determined beforehand (for instance, by scanning).

The information of the one-dimension binary can be obtained by making a one-dimension binary signal having, for instance, two binaries of "1" and "0" based on the assumption of 1 as the positive sign and 0 as the negative sign. As seen in the aforesaid discussion, a one-dimension binary signal makes handling easy, if computerization is introduced. It is even more desirable to have a bar-coding means 6 that bar-codes the information obtained in the one-dimension binary signal composing part. If the information gets bar-coded, recognition of difference in images, pattern matching, etc. can be made at high speed. This is a very big advantage.

Moreover, instead of the embodiment of the present invention as mentioned above, it is possible to adopt an embodiment in which the sign of low frequency part is extracted as the information provided by the DCT sign extraction information providing part 4.

The feature of the face image can often be identified by extracting information existing in a comparatively low frequency part, since information for identifying the person's face appears in the comparatively low frequency part. For example, when the N×N size image shown in FIG. 13(*a*) is transformed by the Full picture DCT, and only the positive and negative signs of the information transformed by DCT are extracted, the positive and negative information on the DCT sign of the same size with the N×N size two-dimension signal (image) shown in FIG. 13(*b*) can be obtained.

Figure 13:
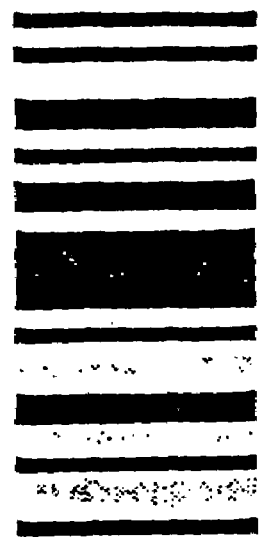
FIG. 13(a) shows the image of the object.
FIG. 13(b) shows the DCT signs of the object image.
FIG. 13(c) shows the object image bar-coded.
Figure 13:
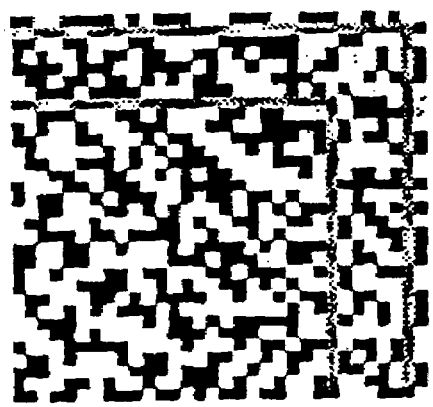
Figure 13:
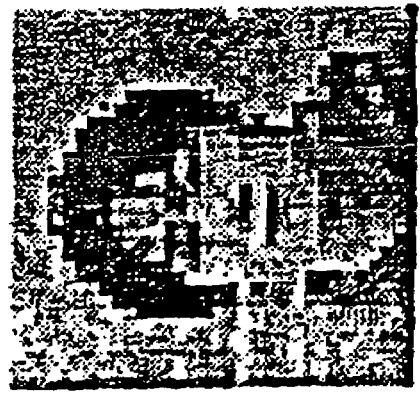
Figure 14:
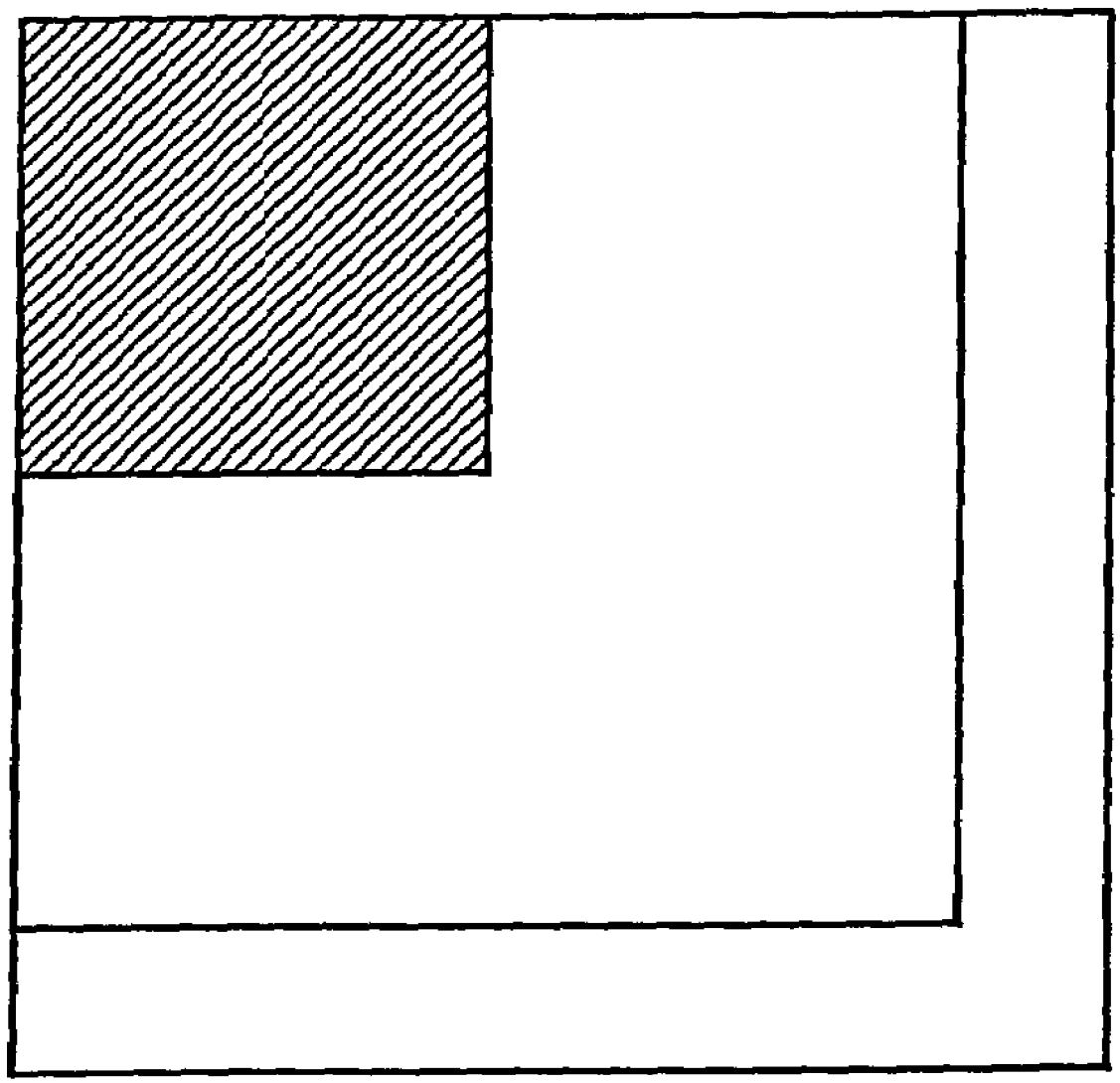
FIG. 14 shows the positions of the DCT sign after DCT transformation has been made.

FIG. 14 shows the positions of the signs shown in FIG. 13(*b*), and especially, the shaded portion in FIG. 4 shows the low frequency part. Scanning of the positive and negative sign information of DCT sign shown in FIG. 13(*b*) from top to bottom, and from left to right can constitute one-dimension binary signals. Moreover, the + (white) and − (black) bar code can also be made. FIG. 13(*c*) shows the resultant bar code. Thus, the person's face can be identified by the sign of the low frequency field. Though the number of signs is decided by the number of image pixel in FIG. 13(*b*), the person's face can be identified by smaller number of signs, if only the low frequency part that is the pixels strongly showing the feature on average in the area is used. In the present invention, taking, for instance, 500 pixels of the image makes it possible to display 2500 different human faces. However, 600-1000 image pixels are normally taken, therefore, $2^{600 \sim 1000}$ different persons' faces can be displayed, which means that infinite number of persons' faces can actually be handled.

Preferable embodiments of the present inventions have so far been described, however, it shall not been interpreted as limiting the present invention. That is, in above-mentioned embodiments the feature of the image is extracted in the extracting part 3 by using the DCT sign extraction information offered from the DCT sign extraction information providing part 4, however, even if neither the extracting part 3 nor the DCT sign extraction information providing part 4 exists, the purpose of this invention can be achieved by extracting only the DCT coefficient signs transformed in the DCT transform part 2, and composing the one-dimension binary signal in the one-dimension binary signal composing part 5 based on the sign (DCT sign) of the DCT coefficient for only extracting the sign of DCT coefficient.

The bar code obtained from the device and method to make the identification signal of the image feature according to the present invention can be used together with a face photo, or independently to make passports, credit cards, driver's licenses, or ID cards.

The Possibility for Applying to the Industry:

As described in detail as above, the present invention makes it possible to provide a device and a method to make the identification signal of the image feature by using the character of DCT sign of an arbitrary signal including the image, applicable to a face photo and the corresponding bar code to be affixed on a new type of passport, credit card, certificate, ID card, etc that are hard to forge to lead to a great contribution to the overall security system. Moreover, the present invention will contribute to the police agency, airport, etc that must identify a face targeted from among a lot of personal faces in a short period of time, which is very important for such special workplaces.

What is claimed is:

1. A method for generating data representative of characteristics of an image comprising:
   (a) inputting a plurality of face images;
   (b) transforming each of the face images into a two-dimensional discrete cosine transform (DCT) to obtain DCT coefficients, wherein each of the DCT coefficients includes DCT amplitude and DCT sign;
   (c) determining a plurality of average DCT amplitudes by averaging DCT amplitudes corresponding to each position of the DCT coefficients;
   (d) identifying average DCT amplitudes having at least a predetermined value and positions corresponding to the identified average DCT amplitudes;
   (e) storing positional information corresponding to the identified average DCT amplitudes;
   (f) inputting a first face image at an image input part;
   (g) transforming the first face image into a two-dimensional DCT at a DCT conversion part to obtain DCT coefficients, wherein each of the DCT coefficients includes DCT amplitude and DCT sign;
   (h) extracting the DCT signs from the DCT coefficients for the first image based on the stored positional information; and
   (i) generating a one-dimensional binary signal representation of the first face image based on the extracted DCT signs.

2. The method of claim 1 further comprising:
   generating a bar code representation of the one-dimensional binary data representation of the first face image.

3. The method of claim 2 further comprising:
   disposing the bar code representation on at least one of a passport, a credit card, a driver's license and an identification card.

4. The method of claim 3 further comprising:
   disposing the first face image on at least one of the passport, the credit card, the driver's license and the identification card.

5. The method of claim 1, wherein in step (a) the images are inputted at the image input part and in step (b) the transforming is performed at the DCT conversion part.

* * * * *